United States Patent [19]

Novak

[11] Patent Number: 5,721,497
[45] Date of Patent: Feb. 24, 1998

[54] COLD TERMINATION FOR A BUS

[75] Inventor: Vit F. Novak, Los Altos, Calif.

[73] Assignee: Sun Microsystems, Inc., Palo Alto, Calif.

[21] Appl. No.: 589,090

[22] Filed: Jan. 23, 1996

[51] Int. Cl.[6] .................................................. H03K 17/16
[52] U.S. Cl. ................................................ 326/30; 375/257
[58] Field of Search ............................ 326/30; 375/257

[56] References Cited

U.S. PATENT DOCUMENTS

| | | | |
|---|---|---|---|
| 5,313,595 | 5/1994 | Lewis et al. ........................... | 326/30 |
| 5,434,516 | 7/1995 | Kosco ................................... | 326/30 |
| 5,513,373 | 4/1996 | Damkier ................................ | 326/30 |
| 5,568,046 | 10/1996 | Samela et al. ....................... | 326/30 |
| 5,583,448 | 12/1996 | Corder et al. ........................ | 326/30 |

*Primary Examiner*—Edward P. Westin
*Assistant Examiner*—Richard Roseen
*Attorney, Agent, or Firm*—Flehr Hobach Test Albritton & Herbert LLP

[57] ABSTRACT

Cold termination is provided at the bus output port of a last device coupled to a bus. Each device includes a termination integrated circuit ("TIC") that receives operating voltage from bus-provided $V_{TERM}$ potential. The TIC includes a series-coupled resistor-capacitor ("R-C") connected between $V_{TERM}$ and ground. The "R-C" junction defines a SENSE node that is coupled to a groundable pin on the device bus output port and to a SENSE input node on the TIC. If a bus cable connector is attached to the device bus output port, attachment grounds the groundable pin, and thus the TIC SENSE node is "0", which disables TLC bus termination. But if no connector is attached, the groundable pin floats to a potential approximating $V_{TERM}$, and is a logical "1", which enables TIC bus termination. Preferably an inverter is series-coupled between the TIC SENSE node and input SENSE node to accommodate a TIC that enables termination with a "0" input SENSE signal. A visual indicator coupled between $V_{TERM}$ and the inverter output illuminates when TIC bus termination is enabled. The present invention can cold terminate a wide-bus at a device, permitting the bus to propagate downstream as a narrow bus, and then cold terminate the narrow bus at the bus output port of a last device coupled to the bus.

25 Claims, 6 Drawing Sheets

COLD TERMINATION FOR A BUS

FIELD OF THE INVENTION

This invention relates to electrical devices that are coupled via a series-coupled bus, and more specifically devices and methods for properly terminating a last device coupled to the bus, even when operating voltage to such device has been turned-off.

BACKGROUND OF THE INVENTION

Electronic systems can include several devices that are electrically coupled together by one or more electric buses. Electrical buses include a plurality of parallel wires or conductive traces and carry data, control signals, operating voltages and the like to the various electrical devices coupled to the bus. While all of the devices must be compatible with the bus, the devices do not otherwise have to be similar. One bus that is commonly used in the computer industry is the so-called small computer system interface or "SCSI" bus.

Among the signals carried (or propagated) by SCSI buses are operating potential $V_{CC}$, which powers the individual devices to which it is coupled, and a termination voltage $V_{TERM}$ that may be used to terminate the last device coupled to the bus. The $V_{CC}$ potential may be switched on or off to a given electrical device, whereas $V_{TERM}$ will always be present whenever at least one device is coupled to the a bus.

Buses often carry high frequency digital signals. Unless the bus is properly terminated with a resistive load, a portion of such signals can reflect back into the last device on the bus, with resultant degradation of signal quality and reduced digital noise margins. It is therefore important that the last device on the bus be properly terminated.

FIG. 1 depicts an electrical system 10 that includes a plurality of devices 20-N, e.g., 20-1, 20-2, 20-3 that nay be series coupled by a bus 30. Although N=3 devices are shown in FIG. 1, it is understood that N may be greater than three. Further, devices 20-N may themselves be integrated circuits ("ICs"). Each device 20-N includes a bus-input node 40-N, a bus-output node 50-N, a power supply VCC node 60-N, and a sense signal node 70-N. While a termination potential $V_{TERM}$ is available from bus 30, in the prior art configuration of FIG. 1 this potential is not used.

Although the bus-input and bus-output node for each device must be compatible to bus 30, the various devices themselves need not be identical. For example, if system 10 includes a computer, device 20-1 might be a hard disk drive, device 20-2 might be a compact disk ("CD") drive, device 20-3 might be an optical drive, and so forth.

A SENSE signal is carried by one or more bus connector pins at node 50-N to the SENSE node 70-N associated with a termination integrated circuit ("TIC") 80-N associated with each device 20-N. For example, if bus 30 is SCSI-compatible, node 50-N will include sense pins 2 and 49. When a bus connector is coupled to bus output port 50-1, the attached bus connector grounds pin 2 and/or pin 49 (e.g., puts them at logical state "0"). But if there is no connector attached to port 50-1, then pins 2 and 49 float (e.g., assume logical state "1") due to the pull-up action provided by $V_{TERM}$ and R1-C1.

As noted, to preserve signal quality and noise margin, bus 30 must be terminated at the output node 50-N of the last device coupled to the bus. In FIG. 1, for example, if device 20-2 were removed from system 10, then device 20-1 would be the last device coupled to bus 30 and termination should occur at node 50-1. Removal of the connector and bus between device 20-1 and 20-1 would unground pins 2 and 49 at node 50-1, causing node 50-1 to float at a "1" state (otherwise pins 2 and 49 at node 50-1 would be at ground or "0" state). Similarly, if devices 20-1 and 20-2 were both present, but device 20-3 were removed from the bus, then device 20-2 would be the last device coupled to bus 30 and termination should occur at ode 50-3. Thus, SENSE node 70-1 on device 20-1 would be rounded (e.g., logical "0"), but SENSE node 70-2 on device 20-2 would be floating (e.g., logical "1") because there would be no bus connector attached thereto.

To achieve bus termination, each device 20-N includes a terminating integrated circuit ("TIC") 80-N that includes plurality of termination resistors R. When SENSE node 70-N="1", termination is enabled, and resistors R are coupled from ground to the data lines and control lines within bus 30. When SENSE node 70-N="0", a bus connector must be connected to bus output port 50-N, termination is disabled, and the various resistors R float (e.g., do not terminate). The operation of the TIC units is shown symbolically in FIG. 1 by a single "switchable" resistor R that is enabled (e.g., coupled from bus to ground) when SENSE="1", and that is disabled e.g., floats) when SENSE="1". In reality, there will be a separate resistor R for each data or parity line in bus 30, there typically being eight data lines and one parity line per byte of bus data. For a SCSI bus 30, the value of R will often be about 110Ω.

Associated with each TIC there is commonly found a series-coupled resistor R1 and capacitor C1, connected between ground and $V_{CC}$. When $V_{CC}$ is applied to the associated device 20-N, the junction of R1 and C1 will be a logical "1", and thus the associated SENSE node 70-N will float, unless the SENSE node is grounded by the presence of a bus connector at bus output port 50-N. It is the R1-C1 pull-up action that ensures a given SENSE node floats at a logical "1" when the associated device has no bus connector at port 50-N. Stated differently, $V_{CC}$ and R1-C1 ensure that SENSE="1" and that an associated TIC 80-N is enabled when the associated device is the last device coupled to bus 30.

Unfortunately, one difficulty with the configuration of FIG. 1 is that $V_{CC}$ must be present (e.g., the associated device 20-N must be "hot") for termination to occur. Assume that device 20-2 is the last device coupled to bus 30, but $V_{CC}$ to device 20-2 is turned-off (e.g., device 20-2 is "cold"). In a "cold" state, there is no potential coupled to the upper end of resistor R1 to pull the voltage across capacitor C1 up to ensure a logical "1" state at SENSE node 70-2. Thus, although termination resistor R within TIC 70-2 should be enabled to achieve termination, no termination will result because device 20-2 is "cold". Because cold termination cannot occur, bus 30 remains unterminated by device 20-2, and signal quality and noise margin in device 20-1 as well as devices coupled to the bus before device 20-1 may suffer degradation.

Thus, there is a need for a method and apparatus for terminating a last device within a string of devices coupled to a bus, regardless of whether $V_{CC}$ operating potential is present at the device, e.g., there is a need for a mechanism affecting "cold" bus termination.

The present invention provides a method and apparatus for cold termination of a last device coupled to a bus.

SUMMARY OF THE PRESENT INVENTION

In a first aspect, the present invention provides a bus-coupled device with a sub-system that includes a generic termination integrated circuit ("TIC") that receives operating voltage from the $V_{TERM}$ potential provided by the bus. The TIC further includes a series-coupled resistor-capacitor connected between $V_{TERM}$ and ground, and an inverter whose input is the TIC voltage groundable SENSE node at the junction between the resistor and capacitor. The TIC voltage groundable SENSE node is also coupled to the device bus output port, When there is a bus connector connected to the device bus output port, the physical connection grounds the TIC SENSE node, forcing the node to "0". The inverter output is then a "1", which disables TIC termination. However if the device is the last device coupled to the bus, the pus output port will not have an attached bus connector. As a result, the TIC SENSE node will approach the $V_{TERM}$ potential and be a logical "1". The resultant "0" output by the inverter enables TIC termination, and the device terminates the bus at the bus output port. Termination is "cold" in that no reliance upon $V_{CC}$ is made, and termination will result whether $V_{CC}$ is present or not. An indicator such as a light emitting diode may be coupled between $V_{TERM}$ and the inverter output to visually identify the last device coupled to the bus, and to confirm bus termination by that device.

In a second aspect, cold termination is provided for a SCSI-compatible bus that can operate in wide and narrow byte-width modes. The bus can begin in wide mode and is terminated by the first device coupled to the wide mode portion of the bus whose bus output port does not have a wide bus connector attached. Thereafter the bus can continue propagate but in narrow mode and is terminated by the first device coupled to the narrow mode portion of the bus whose bus output port does not have a narrow hue connector attached.

Each device includes at least one TIC and associated first and second R-C components coupled between $V_{TERM}$ and ground to define SENSE-wide and SENSE-narrow voltage groundable nodes that are coupled to separate pins on the bus output port of the device. For a SCSI-compatible bus, attachment of a wide bus connector to a device bus output port grounds the SENSE-wide node but permits the SENSE-narrow node to float, disabling all termination. Attachment of a narrow bus connector to the bus output port grounds the SENSE-narrow node but permits the SENSE-wide node to float, enabling wide termination but permitting the bus to propagate further as a narrow bus. If no connector is present at the bus output port, the SENSE-wide and SENSE-narrow nodes each float, enabling wide and marrow termination.

If the bus propagates in narrow mode beyond a device, the bus is terminated in narrow mode by the first device encountered having no connector on the device bus output port. Termination results because the SENSE-narrow mode will float, enabling the TIC. Because commodity TICs can terminate a narrow bus but not a wide bus, the preferred embodiment provides each device with at least a wide-terminating TIC and a narrow-terminating TIC, respectively coupled to SENSE-wide and SENSE-narrow nodes and bus output port connector pins. Similar to the first embodiment, bus termination is "cold" in that no reliance upon the presence or absence of $V_{CC}$ is made.

Other features and advantages of the invention will appear from the following description in which the preferred embodiments have been set forth in detail, in conjunction with the accompanying drawings.

DETAILED DESCRIPTION OF THE PREFERRED EMBODIMENT

Figure 1:
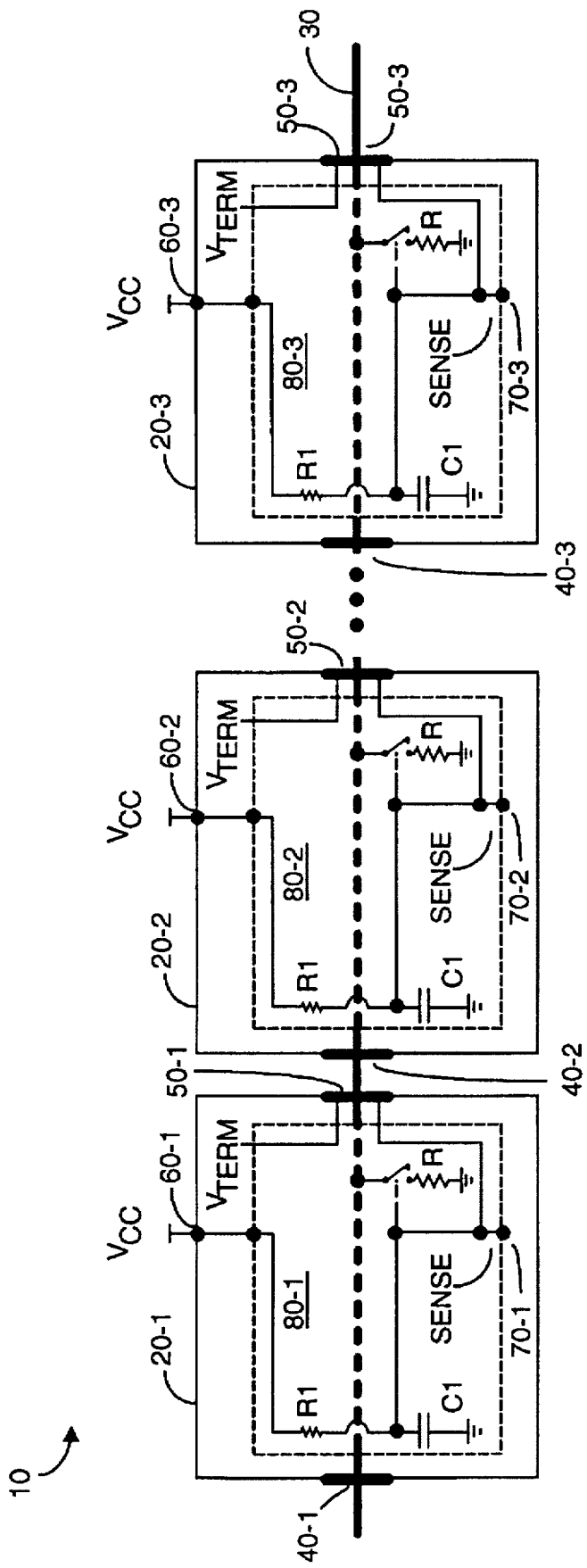
FIG. 1 depicts a string of bus-coupled devices provided with hot termination, according to the prior art.
Figure 2:
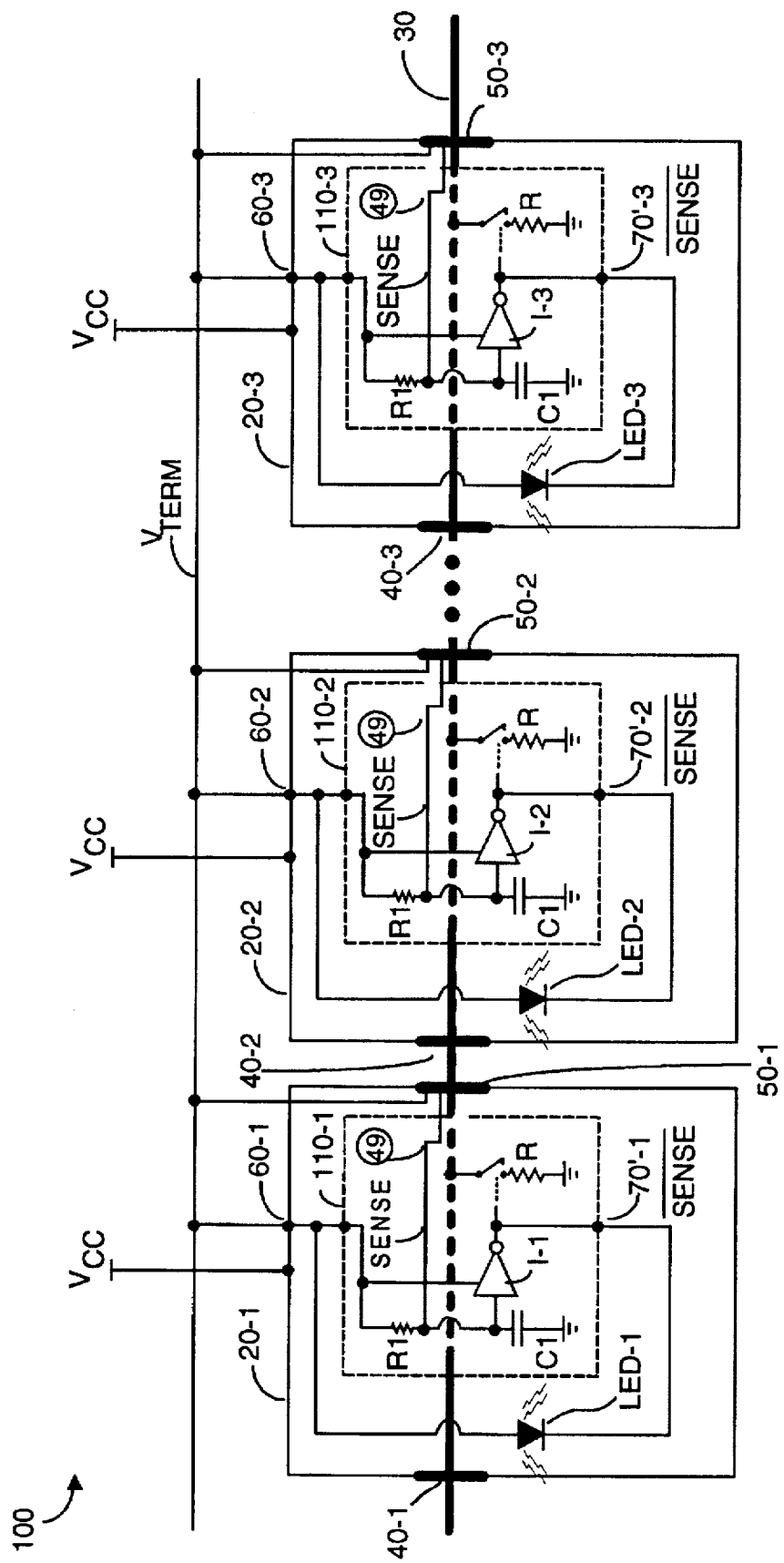
FIG. 2 depicts a string of bus-coupled devices provided with cold termination, according to the present invention.

FIG. 2 depicts a system 100 that implements cold termination of a bus 30, according to the present invention. System 100 includes a plurality of devices 20-N, each of which is coupled to bus 30 via a bus input port 40-N and a bus output port 50-N. Each device includes a terminaion integrated circuit ("TIC") 110-N, and a series coupled resistor-capacitor ("R1-C1") coupled between ground and a source of termination voltage $V_{TERM}$ that is carried by bus 30. $V_{TERM}$ may range in value from about 2 VDC to about 6 VDC and is provided by the bus as long as at least one device 20-N is coupled to the bus. The junction of R1 and C1 defines a groundable SENSE node that is coupled to a groundable pin on the device bus output port 50-N. (The presence of R1 enables the SENSE node to be grounded without damaging the $V_{TERM}$ voltage source.) Although not relevant to the present invention, each device nay be coupleable to a source of operating potential $V_{CC}$. In stark contrast to the prior art, the present invention enables a device to terminate bus 30, regardless of the presence or absence of $V_{CC}$.

In the preferred embodiment, bus 30 is SCSI-compatible and will include at least one pin (e.g., pin 49) that is grounded within a bus cable connector that is attachable to the bus output port 50-N of a device. (This groundable pin is shown in FIG. 2 as an encircled "49".) The R1-C1 SENSE node for each device is coupled to this groundable pin. Thus, for a given device, if the potential at pin 49 is a logical "0" (e.g., SENSE="0"), then a bus cable connector must be attached to the bus output port. In this case, bus termination should be disabled because at least one additional following device must be present on the bus. On the other hand, if the potential at pin 49 is not "0" (e.g., SENSE="1"), then no bus cable connector is attached to the device bus output port. In this case, the present device should enable termination because no other devices follow on the bus.

To accommodate using commercially available TIC units for which SENSE="0" enables termination, each TIC 110-N is provided with an inverter I-N that is powered not from $V_{CC}$ but from $V_{TERM}$, and whose input is coupled to the SENSE node defined at the Junction of R1 and C1. Preferably TICs 110-N and the inverters I-N are complementary metal-oxide-semiconductor ("CMOS") devices, which allows them to operate from a source of operating potential within the range present in $V_{TERM}$. Suitable TICs 110-N may be purchased commercially, for example Unitrode model numbers UC-5613 or UCC-5614. It is understood that R1-C1 and/or inverter I-N may be fabricated as part of the TIC, or fabricated external to the TIC. In the preferred embodiment, R1=10 KΩ, and C1=220 pF, although other values could be used.

Optionally, each device 20-N is provided with a visual indicator such as a light-emitting diode ("LED") LED-N. The operation of TICs 110-N is such that when a "0" is present at the inverted (e.g., complementary) SENSE node 70'-N, the TIC is enabled. As a result, the TIC termination resistors R are coupled between the data/parity lines in bus 30 and ground, terminating the associated device 20-N at bus output port 50-N. Further, the "0" at complementary node 70'-N causes the associated LED-N to conduct current and emit light. Thus, LED-N provides visual identification of device 20-N as the last device coupled to bus 30, and visually confirms that device 20-N is terminating the bus at its bus output port 50-N.

It is apparent from FIG. 2 that $V_{CC}$ need not be present at any device 20-N or at any TIC 110-N, and that proper termination of bus 30 can occur "cold", e.g., in the absence of $V_{CC}$.

Cold bus termination for the configuration of FIG. 2 will now be described in detail. Assume first that device 20-1 is the last device coupled to bus 30, e.g., that device 20-2 and any devices downstream (e.g., to the right, in FIG. 2) are absent. Because 20-1 is the last device coupled to the bus, there will be no bus termination connector attached to bus output port 50-1. If bus 30 is SCSI-compatible, disconnecting a bus connector from bus output port 50-1 will unground pin 49. Ungrounding pin 49 permits the SENSE node to go from a logical "0" to a logical "1", because resistor R1 will pull capacitor C1 up toward the magnitude of $V_{TERM}$. Inverter I-1 inverts the SENSE node "1" to a "0" that is now present at the inverted SENSE node 70'-1.

The "0" at the inverted node 70'-1 enables TIC 110-1, whose internal resistors R will terminate the bus data and control lines in the bus at bus output port 50-1. In addition to enabling termination, the "0" level at node 70'-1 permits LED-1 to conduct current, and thus to emit visible light. LED-1 thus signals users of system 100 that device 20-1 is the last device coupled to bus 30 and has terminated the bus at the device bus output port 50-1. Note that termination results regardless of the presence or absence of $V_{CC}$ at device 20-1.

Consider now the case where devices 20-1 and 20-2 are present, but device 20-3 is removed. Because device 20-2 is present, there will be a bus connector coupled to bus output port 50-1 on device 20-1. Thus for device 20-1, pin 49 (or other pin(s) in a bus using another standard) is "0" at bus output port 50-1, SENSE=0, and termination by TIC 110-1 is disabled. Further, LED-1 is inactive because its cathode and anode terminals are both at a same potential approximating $V_{TERM}$.

But because device 20-3 is removed from the bus, there is no bus connector attached to device 20-2's output bus port 50-2. The absence of a connector ungrounds TIC 110-2's SENSE node, which permits capacitor C1 to charge through resistor R1 to $V_{TERM}$, e.g., to a logical "1" value. Inverter I-2 then outputs a logical "0", which enables TIC 110-2 to terminate the bus at bus output port 50-2. Further, the logical "0" at the inverted SENSE node 70'-2 permits LED-2 to conduct current. LED-2 illuminates and visibly signals that device 20-2 is the last device coupled to bus 30, and has terminated the bus at bus output port 50-2. Again, because no reliance is made upon the presence (or absence) of $V_{CC}$, termination can occur even if device 20-2 is "cold".

Figure 3:
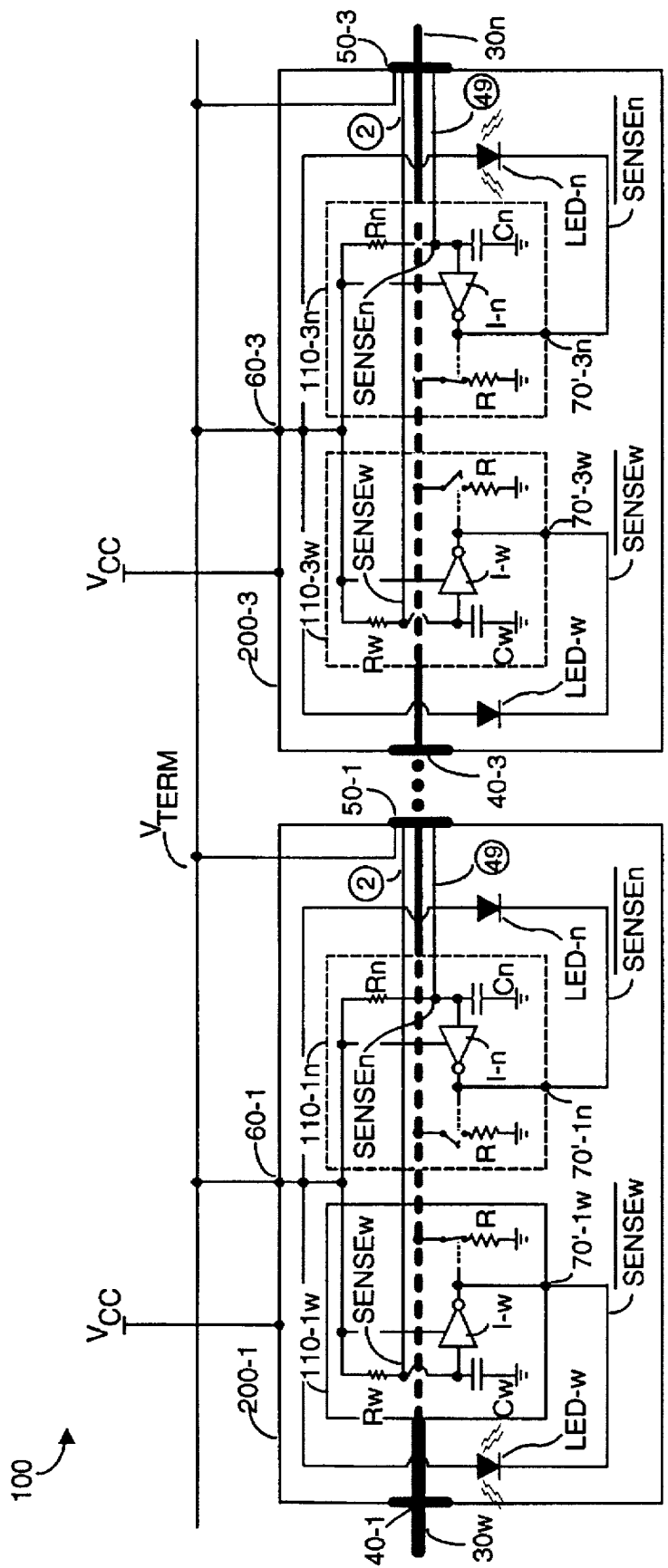
FIG. 3 depicts devices coupled to a wide/narrow SCSI-compatible bus in which wide and narrow cold termination provided, according to the present invention.

An alternative embodiment of the present invention is shown in FIG. 3, in which bus 30 includes a wide SCSI-segment 30w (indicated by a wider-drawn bus line) and a narrow SCSI-segment 30n. The bus is connected in wide mode to bus input connector 40-1 of device 200-1. By wide SCSI-segment it is meant that bus 30 carries at least upper and lower data bit lines representing two bytes (8 data lines each), and associated parity and control lines.

If there is a wide mode bus connector attached to the bus output port 50-1 on device 200-1, then the bus is said to propagate "wide" through device 200-1. The wide bus will propagate and be wide-terminated somewhere downstream by the first following device 200-N having a bus output port 50-N to which a wide bus connector is not attached. If a downstream device has a narrow bus connector attached to its bus output port 50-N, wide bus termination is enabled, but the bus will propagate "narrow" through that device. The narrow bus will propagate and be narrow-terminated somewhere downstream by the first following device 200-N having a bus output port 50-N to which a narrow bus connector is not attached.

For a SCSI-compatible bus, the physical attachment of a wide bus connector to a device bus output port 50-N will ground a wide-groundable pin, commonly pin 2. For the same bus, the physical attachment of a narrow bus connector to a device bus output port 50-N will ground a narrow-groundable pin, commonly pin 49. Thus, by examining, which of these pins is at ground ("0") or at high ("1") potential, one can readily discern whether the present device should terminate wide, terminate narrow, or simply propagate the incoming bus as-is. In FIG. 3, these two groundable pins are denoted with an encircled "2" (wide termination pin) and an encircle "49" (narrow termination pin).

Coupled between ground and $V_{TERM}$, each wide/narrow bus compatible device 200-N includes a wide and a narrow resistor-capacitor (Rw-Cw), (Rn-Cn) series-combination, the w and n nomenclature denoting "wide" and "narrow" respectively). The Junction between Rw and Cw defines a wide sense node SENSEw that is coupled to wide-mode groundable pin 2 on bus output port 50-N. Similarly, the Rn-Cw Junction defines a narrow sense node SENSEn that is coupled to narrow-mode groundable pin 49 on bus output port 50-N. Of course, a different bus definition could provide for other and/or more groundable pins aside from pin 2 and/or pin 49.

In FIG. 3, separate wide and narrow termination integrated circuits 110-Nw, 110-Nn are shown on the assumption that generic TICs are used that can only terminate one byte and associated parity bit worth of lines. Of course if a suitable TIC were used that could fully terminate the wide bus, each device 200-N would require a separate Rw-Cw, Rn-Cn pair of resistor-capacitors, but would use only one TIC.

Each TIC 100-Nw, 100-Nn preferably includes an inverter N-w, N-n that inverts the SENSE node logic signal, which is coupled to nodes 70'-Nw and 70'-Nn. Again, if suitable TIC units are used that enable termination with a "1" at nodes 70'-1n, w then inverters N-w,n could be omitted.

Similar to what was described with respect to FIG. 2, an LED indicator device preferably is series-coupled between $V_{TERM}$ and each inverted SENSE node. Thus, the cathode end of LED-w is coupled to node 70'-Nw, and the cathode end of LED-n is coupled to node 70'-Nn. If the inverters are omitted, a different wiring configuration for the LEDs would be required. Alternatively, a glowing LED could be used to signal non-termination, and an extinguished LED could signal termination.

As shown by the thicker line width in FIG. 3, input bus connector 40-1 of device 200-1 receives a wide bus 30w. If there is a wide bus connector connected to bus output port 50-1, device 200-1 will simply propagate the wide bus, without termination. The presence of such a wide bus connector will ground pin 2 and pin 49. Similar to that was described with respect to FIG. 2, if pin 2 is grounded, SENSEw is a "0", inverter I-w outputs a "1", TIC 110-1w is disabled (e.g., does not wide terminate), and LED-w is turned off. Similarly, when pin 49 is grounded, SENSEn= "0", TIC 110-1n is disabled (e.g., does or narrow terminated) and LED-n is turned off. In a SCSI-compatible environment, the case of pin 2 ground and pin 49 floating would have no practical application. However, those skilled in the art of circuit design will recognize that the present invention could readily be adapted to recognize such a condition and to terminate appropriately.

Assume, now that a narrow bus cable connector is attached to bus output port 50-1. The attachment of such a connector will ground pin 49, but will unground (e.g., let float) pin 2. Thus, SENSEw floats at a potential approximately $V_{TERM}$ and constitutes a logical "1", and inverter I-w outputs a logical "0". TIC 110-1w is enabled, terminating all wide lines (assuming that a single TIC could terminate all necessary lines), and LED-w glows to visually indicate that device 200-1 has provided wide termination to bus 30w. From the bus output port 50-1, the bus will continue but as a narrow bus 30n. The wide termination is graphically depicted in FIG. 3 by the connection to upper end of resistor R in TIC 100-1w, and the absence of such a connection to resistor R within TIC 100-1n.

The narrow bus 30n may propagate through various downstream devices 200-N without being terminated until encounntering the first device having no connector attached to its bus output port 50-N. Assume in FIG. 3 that device 200-3 has no connector at its bus output port 50-3. The absence of any bus connector causes pin 2 and pin 49 to float, and inverters I-w and I-n will each output "0". The "0" at SENSEn enables TIC 100-3n, terminating the narrow bus lines and causing LED-n to glow, visually indicating that device 200-3 has narrow-terminated bus 30n. (Although TIC 100-3w is also enabled, there are no wide lines to be terminated.) If desired, logic could be included to prevent LED-w from also glowing in this state.

Figure 4:
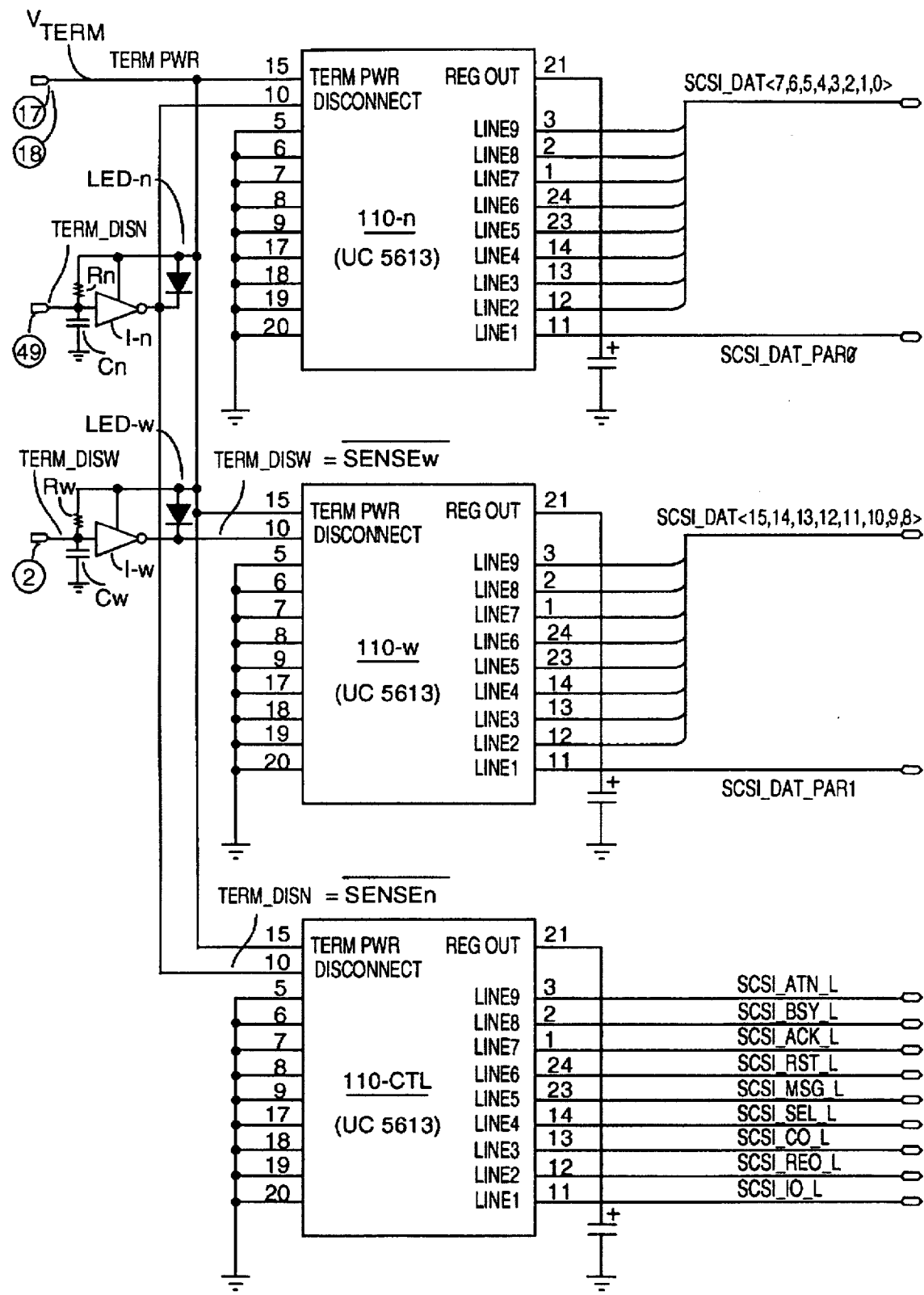
FIG. 4 depicts a preferred embodiment of three termination integrated circuits configured to cold terminate a wide/narrow SCSI-compatible bus, according to the present invention.

FIG. 4 depicts a preferred embodiment in which TICs 110-n (for "narrow"), 110-w (for "wide") and 110-CTL (for "control") are used to wide/narrow terminate a bus having twenty-seven lines requiring termination (2 bytes, 2 parity bits, and 9 control signals). In this embodiment, each TIC is a generic Unitrode UC 5613 (although a Unitrode model UCC-5614 may also be used), an integrated circuit capable of terminating only nine bus lines.

Thus, TIC 110-n will terminate the lowest eight data-lines (here denoted, SCSI_DAT<0>through SCSI$_{13}$ DAT<7>) in narrow-mode termination, TIC 110-w will additionally terminate the upper eight data lines (here denoted SCSI$_{13}$ DAT<8>through SCSI$_{13}$ DAT<15>. TIC 110-CTL will terminate the nine control lines (e.g. SCSI$_{13}$ ATN$_{13}$ L through SCSI$_{13}$ IO$_{13}$ L), whenever 110-n is enabled, which is to say in either narrow-termination or wide-termination mode.

TICS 110-n and 110-w function similarly as to what was described with respect to. FIG. 3. If, for example, a wide bus cable terminator is attached to a device 200-N that includes the three TICs shown in FIG. 4, pin 2 (shown at left side of the figure) would be grounded. Inverter I-w would output a "1" to pin 10 of TIC 100-w, disabling wide termination. However, if no such connector were present, pin 2 would float, and inverter I-w would output a "0" to pin 10, enabling TIC 110-w to provide wide-termination.

At the bottom of FIG. 4, TIC 110-CTL provides termination for the nine control lines that will normally be resent in a wide or a narrow SCSI-compatible bus. As shown, the control lines terminate whenever inverter I-n outputs a "0", e.g., whenever narrow termination is required. However since wide-termination includes narrow termination, the control lines will be cold terminated whenever the device including the three TICs is either narrow-mode or wide-mode terminated.

Figure 5:
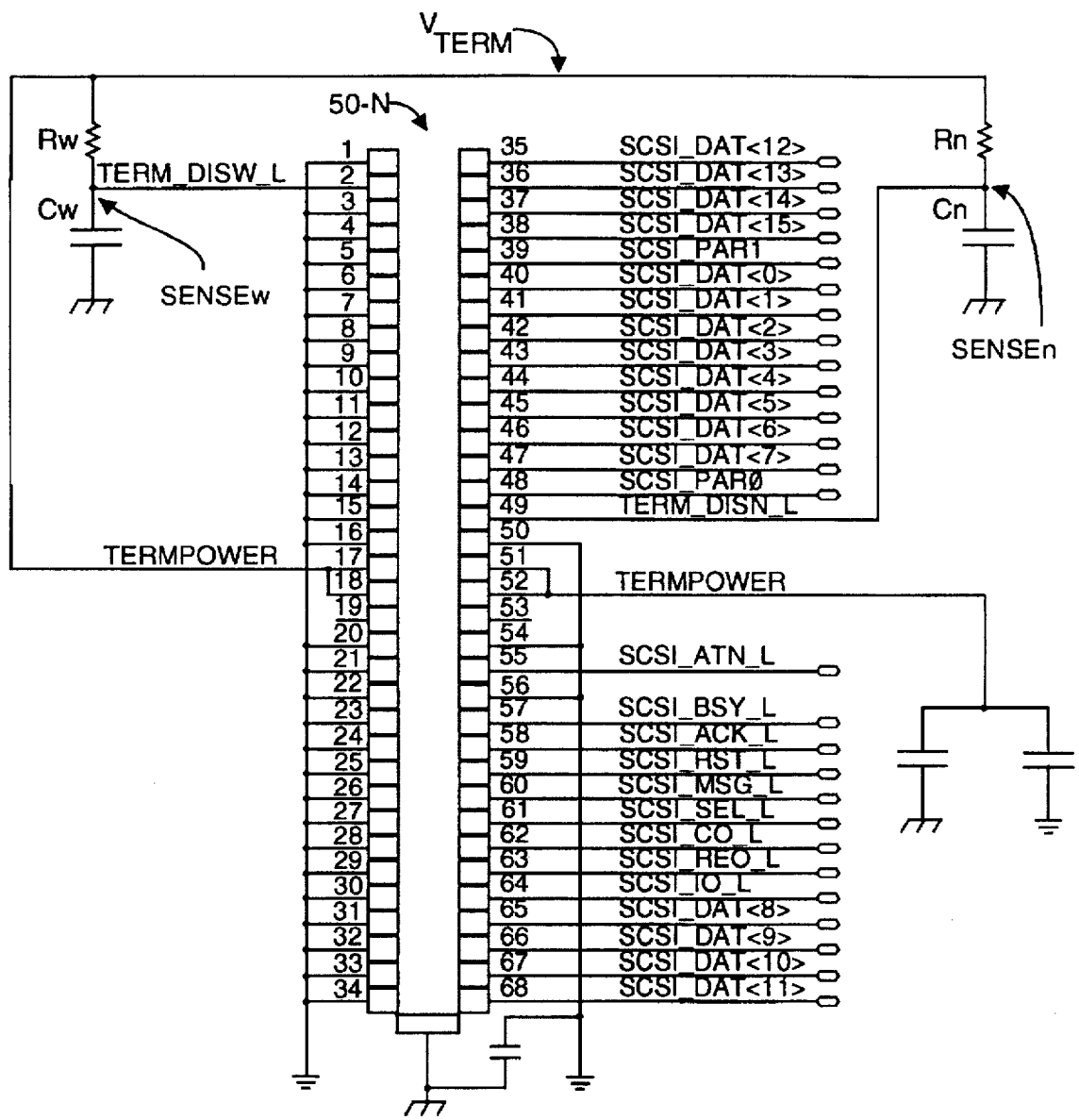
FIG. 5 depicts the pin-out on a device wide/narrow bus output port, as may be used with the present invention.

FIG. 5 shows the pin-out for a bus output port, port 50-N for a device 200-N in FIG. 3, as well as the Rw-Cw and Rn-Cn resistor-capacitor connections, for ease of understanding.

Figure 6B:
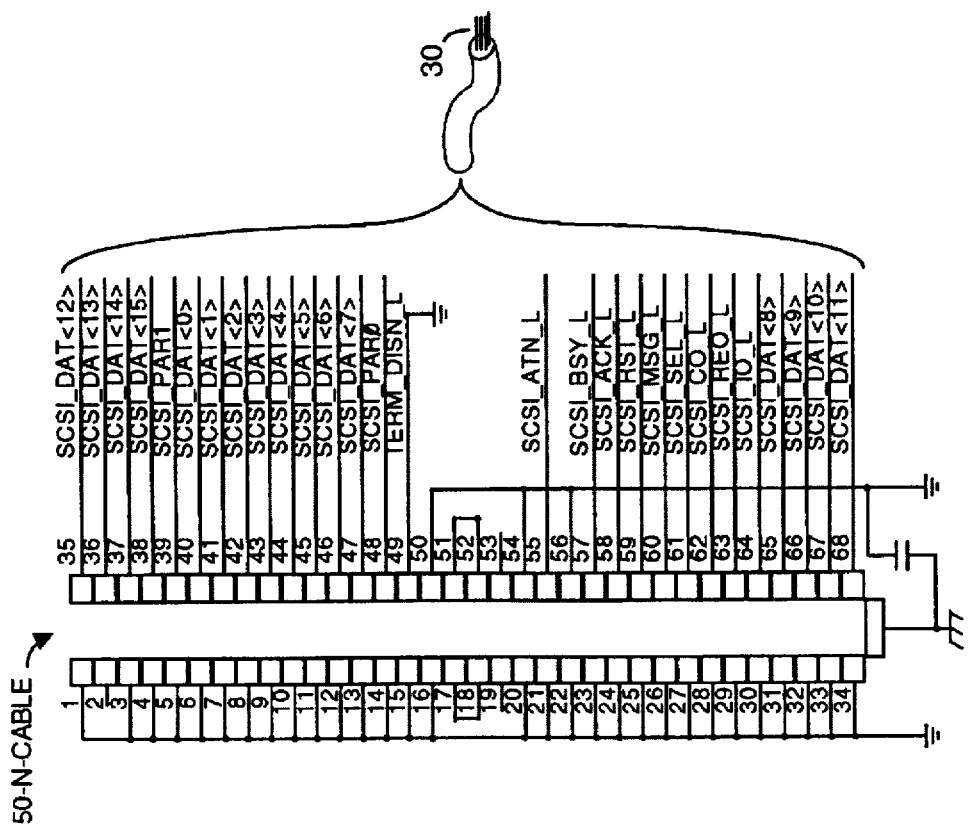
FIG. 6B depicts a narrow-bus cable connector, as used with the present invention.
Figure 6A:
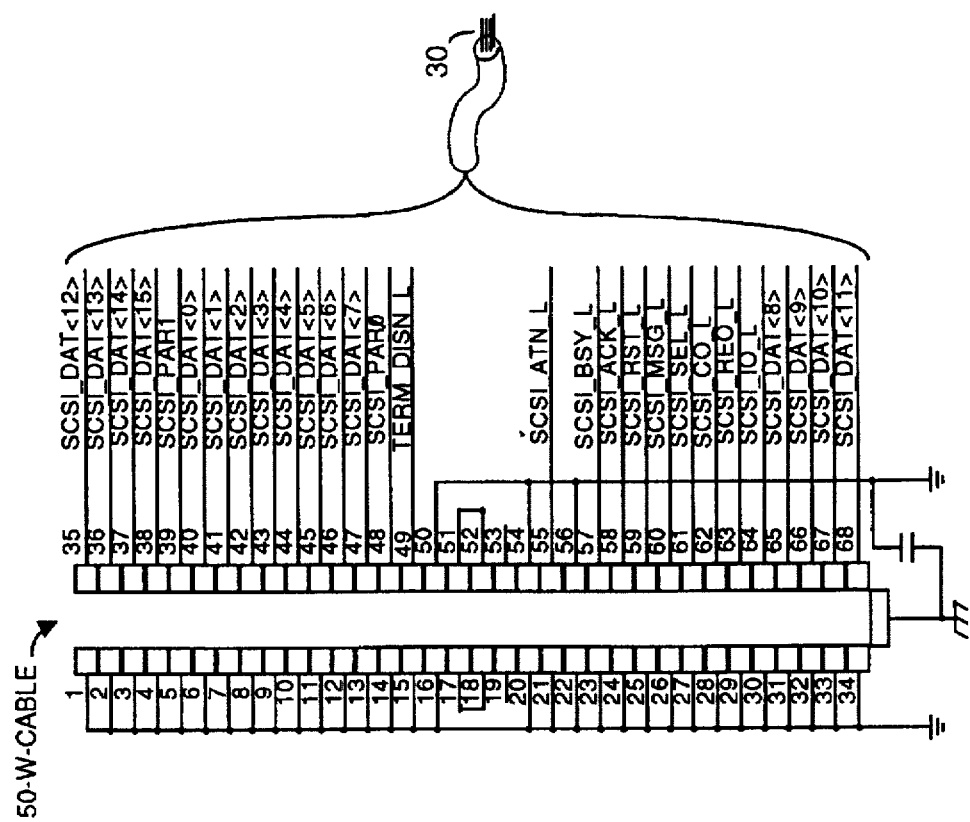
FIG. 6A depicts a wide-bus cable connector, as used with the present invention.

FIG. 6A depicts a wide bus cable connector 50-W-CABLE affixed to a bus 30. As shown by FIG. 6A, pin 2 is directly coupled to ground. This, if this wide bus connector were coupled to bus output port 50-N (which is to say to the port connector shown in FIG. 5), the wide sense SENSEw) node would be "0". As described earlier, this would disable wide-bus termination, which is proper since there is no need to terminate a device to whose bus output port a connector is attached.

By contrast, FIG. 6B depicts a narrow bus cable connector 50-N-CABLE affixed to a bus 30. Note that pin 2 in this connector now floats, which will result in wide termination, but that pin 49 is grounded, which will disable narrow termination. On the other hand, if no bus cable connector whatsoever were attached to a device bus output port, pin 2 and pin 49 would both float, and wide bus termination would be enabled.

The preferred embodiments have been described with respect to cold terminating SCSI-compatible buses. However, other buses that provide a persistent voltage analogous to $V_{TERM}$ and provide a state change at at least one connector pin that is not dependent upon the presence of $V_{CC}$ may also be cold terminated according to the present invention.

Modifications and variations may be made to the disclosed embodiments without departing from the subject and spirit of the invention as defined by the following claims.

What is claimed is:

1. In a system including at least two devices each having a bus input port and a bus output port and being coupleable to an electrical bus carrying lines that include at least a termination voltage ($V_{TERM}$) line, a method for cold terminating the bus at the output port of the last device coupled to the bus, the method including the following steps:

(a) providing each of said devices with a termination integrated circuit ("TIC") that has a TIC SENSE node, a $V_{TERM}$ node coupled to receive said $V_{TERM}$ from said bus for use as a TIC operating voltage, and a plurality of termination impedances for terminating a like plurality of terminatable lines of said bus upon receipt of a termination ENABLE signal at said TIC SENSE node;

(b) providing each said TIC with a groundable voltage SENSE node that is coupled by a current limiting element to said $V_{TERM}$ node to be at a logical "1" level unless said groundable voltage SENSE node is grounded, in which case said groundable voltage SENSE node is at a logical "0" level; and (c) coupling said voltage groundable SENSE node to said TIC SENSE node and to a first chosen pin on said output port of said device that includes said TIC, said first chosen pin being at a logical "0" level when said output port is coupled to said bus, and being at a logical "1" level otherwise;

wherein when a device is a last device coupled to said bus, said output port is uncoupled from said bus and said logical "1" level at said first chosen pin on said last device causes said TLC SENSE node to be at a logic level representing a termination ENABLE signal for said TIC, whereupon said TIC terminates said terminatable lines of said bus;

termination of said lines of said bus occurring without regard to whether said bus also provides an operating potential ($V_{CC}$) to said device or to said TIC.

2. The method of claim 1, wherein said TIC includes a series-coupled resistor and capacitor coupled between said $V_{TERM}$ node and ground, and wherein said groundable voltage SENSE node is defined at a connection between said resistor and said capacitor.

3. The method of claim 1, wherein at step (a) said TIC is enabled to terminate when said ENABLE signal is a "0" level, and wherein step (a) further includes logically inverting a logic signal at said groundable voltage SENSE node and coupling a thus inverted logic signal to said TLC SENSE node.

4. The method of claim 3, wherein said logically inverting is carried out by an inverter integrated circuit coupled to receive operating power from said $V_{TERM}$.

5. The method of claim 1, further including coupling a termination state indicator between said $V_{TERM}$ node and said TLC SENSE node;

wherein when said TLC receives an ENABLE signal and terminates said terminatable lines, said indicator signals that termination is occurring within said device.

6. The method of claim 3, further including coupling a visual indicator between said $V_{TERM}$ node and said TLC SENSE node;

wherein when said TLC receives an ENABLE signal and terminates said terminatable lines, said indicator conducts current and signals that termination is occurring.

7. The method of claim 1, wherein said $V_{TERM}$ has a magnitude ranging from about 2 VDC to about 6 VDC.

8. The method of claim 1, wherein said bus is SCSI-compatible.

9. The method of claim 1, wherein:

said bus is operable and coupleable to a said input port of a first device in a wide-mode and propagates from a said output port of said first device in said wide-mode or a narrow-mode depending upon whether a wide-mode or a narrow-mode bus connection is made to said output port of said first device, said wide-mode requiring termination of more terminatable lines in said bus by said TIC in said first device than are terminated in said narrow mode;

step (a) includes providing each of said devices with a second termination integrated circuit ("TIC") that has a second TIC SENSE node, a $V_{TERM}$ node coupled to receive said $V_{TERM}$ from said bus for use as a TIC operating voltage, and a plurality of termination impedances for terminating a like plurality of wide-mode terminatable lines of said bus upon receipt of a second termination ENABLE signal at said second TIC SENSE node;

step (b) includes providing each said second TIC with a second groundable voltage SENSE node that is coupled by a second current limiting element to said $V_{TERM}$ node to be at a logical "1" level unless said second groundable voltage SENSE node is grounded, in which case said second groundable voltage SENSE node is at a logical "0" level; and step (c) includes providing each said output port of each said device with a second chosen pin that is at logical "0" level when said output port is coupled in said wide-mode to said bus, and is at logical "1" level otherwise, said first chosen pin being at logical "0" level when said output port is coupled in said narrow-mode to said bus, and being at a logical "1" level otherwise;

wherein when said output port in a not last device is coupled to said bus in said narrow-mode, said logical "0" level at said second chosen pin of said not last device causes said second termination ENABLE signal to ENABLE said second TIC in said not last device to terminate said wide-mode terminatable lines of said bus, said bus propagating further in narrow-mode to at least one other said device coupled to said bus.

10. The method of claim 1, wherein said current limiting element is a resistor.

11. The method of claim 9, wherein said second current limiting element is a resistor.

12. In a system including at least two devices each having a bus input port and a bus output port and being coupleable to a SCSI-compatible bus carrying lines that include at least a termination voltage ($V_{TERM}$), a method for terminating the bus at the output port of the last device coupled to the bus regardless of whether the last device receives an operating voltage $V_{CC}$ from the bus, the method including the following steps:

(a) providing each of said devices with a first termination integrated circuit ("TIC") that has a first TIC SENSE node, a $V_{TERM}$ node coupled to receive said $V_{TERM}$ from said bus for use as a TIC operating voltage, and a first plurality of termination impedances for terminating a like first plurality of terminatable lines of said bus upon receipt of a termination ENABLE signal at said first TIC SENSE node;

(b) series-coupling a resistor and a capacitor between said $V_{TERM}$ node and ground such that a junction between said resistor and said capacitor defines a first groundable voltage SENSE node that is at a logical "1" level unless said first groundable voltage SENSE node is grounded, in which case said first groundable voltage SENSE node is at a logical "0" level; and (c) coupling said first voltage groundable SENSE node to said first TIC SENSE node and to a first chosen pin on said output port of said device that includes said TIC, said first chosen pin being at a logical "0" level when said output port is coupled to said bus in a first bus mode, and being at a logical "1" level otherwise;

when a device is a last device coupled to said bus, said output port of said last device is uncoupled from said bus and said logical "1" level at said first chosen pin of said last device causes said first TLC SENSE node to be at a logic level representing a termination ENABLE signal for said first TIC, whereupon said first TIC terminates said first plurality of terminatable lines of said bus;

termination occurring without regard to whether said bus also provides an operating potential ($V_{CC}$) to said device or to said first TIC.

13. The method of claim 12, wherein at step (a) said first TIC is enabled to terminate when said ENABLE signal is a "0" level, and wherein step (a) further includes logically inverting a logical level at said groundable voltage SENSE node and coupling a thus inverted logic state voltage to said first TLC SENSE node.

14. The method of claim 13, wherein said logically inverting is carried out using an inverter circuit coupled to receive operating voltage from said $V_{TERM}$.

15. The method of claim 12, wherein said $V_{TERM}$ has a magnitude ranging from about 2 VDC to about 6 VDC.

16. The method of claim 12, further including coupling a termination state indicator between said $V_{TERM}$ node and said first TLC SENSE node;

wherein when said first TLC receives an ENABLE signal and terminates said first mode terminatable lines, said indicator signals that such termination is occurring.

17. The method of claim 12, wherein:

said bus is operable and coupleable to a said input port of a first device in a wide-mode and propagates from a said output port of said first device in a said wide-mode or a narrow-mode depending upon whether a wide-mode or a narrow-mode bus connection is made to said output port of said first device, said wide-mode requiring termination of more terminatable lines in said bus by a said TIC in said first device than are terminated in said narrow-mode;

said first plurality of terminatable lines represents lines in said bus in said narrow-mode;

step (a) includes providing each of said devices with a second termination integrated circuit ("TIC") that has a second TIC SENSE node, a $V_{TERM}$ node coupled to receive said $V_{TERM}$ from said bus for use as a TIC operating voltage, and a second plurality of termination impedances for terminating a like second plurality of wide-mode terminatable lines of said bus upon receipt of a second termination ENABLE signal at said second TIC SENSE node;

step (b) includes providing each said second TIC with a second groundable voltage SENSE node that is coupled by a current limiting element to said $V_{TERM}$ node to be at a logical "1" level unless said second groundable voltage SENSE node is grounded, in which case said second groundable voltage SENSE node is at a logical "0" level; and step (c) includes providing each said output port of each said device with a second chosen pin that is at logical "0" level when said output port is coupled in said wide-mode to said bus, and is at logical "1" level otherwise, said first chosen pin being at logical "0" level when said output port is coupled in said narrow-mode to said bus, and being at logical "1" level otherwise;

wherein when a said output port in a not last device is coupled to said bus in said narrow-mode, said logical "0" level at said second chosen pin of said not last device causes said second termination ENABLE signal to ENABLE said second TIC in said not last device to terminate said wide-mode terminatable lines of said bus, said bus propagating further in narrow-mode to at least one other said device coupled to said bus.

18. The method of claim 17, wherein said current limiting element is a second resistor.

19. For use with a system including at least two devices each having a bus input port and a bus output port and being coupleable to an electrical bus carrying lines that include at least a termination voltage ($V_{TERM}$) line, a sub-system for each of said devices providing cold termination of the bus at the output port of the last device coupled to the bus, the sub-system comprising:

a first termination integrated circuit ("TIC") having a first TIC SENSE node, a $V_{TERM}$ node coupled to receive said $V_{TERM}$ from said bus for use as a TIC operating voltage, and a first plurality of termination impedances for terminating a like first plurality of terminatable lines of said bus upon receipt of a first termination ENABLE signal at said first TIC SENSE node;

a first groundable voltage SENSE node, coupled by a current limiting element to said $V_{TERM}$ node; said first groundable SENSE node being a logical "1" level unless said groundable voltage SENSE node is grounded, in which case said first groundable voltage SENSE node is at a logical "0" level;

said first voltage groundable SENSE node being coupled to said first TIC SENSE node and to a first chosen pin on said output port of a said device including said TIC, said first chosen pin being at a logical "0" level when said output port is coupled to said bus, and being at a logical "1" level otherwise;

wherein when a device is a last device coupled to said bus, said output port of said last device is uncoupled from said bus and said logical "1" level at said first chosen pin of said last device causes said first TLC SENSE node to be at a logic level representing a first termination ENABLE signal for said first TIC, whereupon said first TIC terminates said first plurality of terminatable lines of said bus;

termination of said first plurality of lines occurring without regard to whether said bus also provides an operating potential ($V_{CC}$) to said device or to said first TIC.

20. The sub-system of claim 19, wherein said first TIC is enabled to terminate when said first termination ENABLE signal is a "0" level;

said sub-system further including an inverter circuit coupled to invert a signal at said first groundable voltage SENSE node and to output an inverted version thereof to said first TLC SENSE node, said inverter circuit coupled to receive operating voltage from said $V_{TERM}$.

21. The sub-system of claim 19, further including a resistor and a capacitor series-coupled between said $V_{TERM}$ node and ground such that a junction between said resistor and said capacitor defines said first groundable voltage SENSE node.

22. The sub-system of claim 19, further including a termination state indicator, coupled between said $V_{TERM}$ node and said first TLC SENSE node;

wherein when said first TLC is enabled and terminates said first plurality of terminatable lines, said indicator signals that termination is occurring within said device.

23. The sub-system of claim 19, wherein said bus is operable and coupleable to a said input port of a first device in a wide-mode and propagates from a said output port of said first device in a said wide-mode or a narrow-mode depending upon whether a wide-mode or a narrow-mode bus connection is made to said output port of said first device, said wide-mode requiring termination of more terminatable lines in said bus than are terminated in said narrow-mode, said sub-system further including:

a second termination integrated circuit that has a second TIC SENSE node, a $V_{TERM}$ node coupled to receive said $V_{TERM}$ from said bus for use as a TIC operating voltage, and a second plurality of termination impedances for terminating a like second plurality of wide-mode terminatable lines of said bus upon receipt of a second termination ENABLE signal at said second TIC SENSE node;

a second groundable voltage SENSE node, coupled by a second current limiting element to said $V_{TERM}$ node; said second groundable SENSE node being a logical "1" level unless said second groundable voltage SENSE node is grounded, in which case said second groundable voltage SENSE node is at a logical "0" level;

said second voltage groundable SENSE node being coupled to said second TIC SENSE node and to a second chosen pin on said output port of a said device including said TIC, said second chosen pin being at a logical "0" level when said output port is coupled in said wide-mode to said bus, and being at a logical "1" level otherwise;

wherein when a said output port in a not last device is coupled to said bus in said narrow-mode, said logical "0" level at said second chosen pin of said not last device causes said second termination ENABLE signal to ENABLE said second TIC in said not last device to terminate said second plurality of terminatable lines of said bus, said bus propagating further in narrow-mode to at least one other said device coupled to said bus.

24. The sub-system of claim 19, wherein said current limiting element is a resistor.

25. The sub-system of claim 23, wherein said second current limiting element is a resistor.

* * * * *

UNITED STATES PATENT AND TRADEMARK OFFICE
CERTIFICATE OF CORRECTION

PATENT NO. : 5,721,497

DATED : February 24, 1998

INVENTOR(S) : NOVAK

It is certified that error appears in the above-identified patent and that said Letters Patent is hereby corrected as shown below:

Column 1, line 6, immediately following "specifically" insert --to--.

Column 1, line 37, delete "nay" and insert therefor --may--.

Column 2, line 8, delete "ode" and insert therefor --node--.

Column 2, line 9, delete "rounded" and insert therefor --grounded--.

Column 2, line 24, delete "SENSE-"1"", and insert therefor --SENSE-"0"--.

Column 2, line 46, delete "e.g.," and insert therefor --e.g.,--.

Column 2, line 60, delete "e.g.," and insert therefor --e.g.,--.

Column 3, line 13, delete "pus" and insert therefor --bus--.

Column 3, line 32, delete "hue" and insert therefor --bus--.

Column 3, line 47, delete "marrow" and insert therefor --narrow--.

Column 4, line 4, immediately following "termination" insert --is--.

Column 5, line 1, delete "RI=10 KΩ, and C1=220" and insert therefor --RI≈10 KΩ, and C1≈220--.

Column 6, line 39, delete "Junction" and insert therefor --junction--.

Column 6, line 56, delete "70'-1n, w" and insert therefor --70'-1n,w--.

UNITED STATES PATENT AND TRADEMARK OFFICE
CERTIFICATE OF CORRECTION

PATENT NO. : 5,721,497

DATED : February 24, 1998

INVENTOR(S) : NOVAK

It is certified that error appears in the above-identified patent and that said Letters Patent is hereby corrected as shown below:

Column 7, line 8, delete "does or narrow" and insert therefor --does not narrow--.

Column 7, line 55, delete "$SCSI_{13}DAT$" and insert therefor --SCSI_DAT--.

Column 7, line 56, delete "$SCSI_{13}ATN_{13}L$" and insert therefor --SCSI_ATN_L--.

Column 7, line 57, delete "$SCSI_{13}IO_{13}L$" and insert therefor --SCSI_IO_L--.

Column 8, line 2, delete "resent" and insert therefor --present--.

Column 8, line 10, delete "port, port" and insert therefor --port, e.g., port--.

Column 8, line 18, immediately preceding "SENSEw)" insert --(--.

Signed and Sealed this

Nineteenth Day of May, 1998

Attest:

BRUCE LEHMAN

*Attesting Officer*

*Commissioner of Patents and Trademarks*